United States Patent [19]

Hashimoto

[11] Patent Number: 5,687,311
[45] Date of Patent: Nov. 11, 1997

[54] MICROCOMPUTER WITH DETECTION OF PREDETERMINED DATA FOR ENABLING EXECUTION OF INSTRUCTIONS FOR STOPPING SUPPLY OF CLOCK

[75] Inventor: Hiroyuki Hashimoto, Itami, Japan

[73] Assignees: Mitsubishi Denki Kabushiki Kaisha, Tokyo; Mitsubishi Electric Semiconductor Software Co., Ltd., Hyogo, both of Japan

[21] Appl. No.: 455,245

[22] Filed: May 31, 1995

[30] Foreign Application Priority Data

Jul. 21, 1994 [JP] Japan .................................. 6-169564

[51] Int. Cl.[6] ............................................. G06F 1/08
[52] U.S. Cl. ............................ 395/183.1; 395/733
[58] Field of Search ......................... 395/800, 183.1, 395/750, 733

[56] References Cited

U.S. PATENT DOCUMENTS 4,831,516   5/1989   Tanaka ................................ 364/700
5,336,939   8/1994   Eitrheim ............................. 307/269
5,365,047  11/1994   Yamaguchi .......................... 235/380
5,369,771  11/1994   Gettel ................................. 395/750
5,473,767  12/1995   Kardach ............................. 395/550
5,546,568   8/1996   Bland ................................. 395/550

FOREIGN PATENT DOCUMENTS 5-224966   9/1993   Japan .

*Primary Examiner*—Eric Coleman
*Attorney, Agent, or Firm*—Lowe, Price, LeBlanc & Becker

[57] ABSTRACT

A microcomputer comprising an exclusive register 61, an STP/WIT instruction valid/invalid control circuit 60 which detects that data are written consecutively in the register 61 and that values of the data are in a predetermined combination, and AND gates 11 and 12 which permit execution of the STP instruction and the WIT instruction for stopping clock φ only when the predetermined signal is outputted from the STP/WIT instruction valid/invalid control circuit 60, and capable of avoiding the instruction for stopping the internal clock being executed by mistake.

5 Claims, 4 Drawing Sheets

MICROCOMPUTER WITH DETECTION OF PREDETERMINED DATA FOR ENABLING EXECUTION OF INSTRUCTIONS FOR STOPPING SUPPLY OF CLOCK

BACKGROUND OF THE INVENTION

1. Field of the Invention

The present invention relates to a microcomputer, particularly to a microcomputer having a function for stopping an internal clock by executing a specific instruction, specifically a stop instruction (STP instruction) or a wait instruction (WIT instruction).

2. Description of the Related Art

While a microcomputer generally operates in synchronization with an internal clock, it is often provided with instructions to stop the internal clock, namely the stop instruction (STP instruction) and the wait instruction (WIT instruction), for the purpose of debugging or other operations during development and manufacturing or, in order to reduce the power consumption of battery-operated type.

FIG. 1 is a block diagram showing an example of a configuration of an essential portion to execute the STP instruction and the WIT instruction of such a conventional microcomputer, with the basic description thereof being disclosed in Japanese Patent Application Laid-Open No. 5-224966 (1993).

In FIG. 1, reference numeral 51 denotes a memory which stores various kinds of instruction codes including the STP instruction and the WIT instruction. Reference numeral 52 denotes a decoder which decodes instruction codes read from the memory 51 in a predetermined procedure. When the decoder 52 decodes the STP instruction, it outputs a significant STP instruction valid signal STPV. When the decoder 52 decodes the WIT instruction, it outputs a significant WIT instruction valid signal WITV.

Reference numeral 53 denotes a WIT instruction execution circuit whereto the significant WIT instruction valid signal WITV is given via a signal line when the decoder 52 decodes the WIT instruction. Reference numeral 54 denotes an STP instruction execution circuit whereto the significant STP instruction valid signal STPV is given via a signal line when the decoder 52 decodes the STP instruction. Both the instruction execution circuits 53 and 54 are constituted of flip-flops, for example, and are usually in reset state as a reset signal (RST) or an interrupt signal (INT) is given to reset terminals thereof, and the output signals of the instruction execution circuits 53 and 54 are in insignificant state ("L" level). Although the output signals turn to significant state ("H" level) when the significant WIT instruction valid signal WITV or the significant STP instruction valid signal STPV are inputted to set terminals thereof from the decoder 52.

Reference numeral 55 denotes a 2-input AND gate with one input terminal receiving the output signal of the WIT instruction execution circuit 53 and another input terminal receiving the output signal of an AND gate 56. The AND gate 56 also has two inputs, with one input terminal receiving the output signal of the STP instruction execution circuit 54 and another input terminal receiving an external clock inputted from an external clock input terminal Xin.

Therefore, in the normal state where both instruction execution circuits 53 and 54 are set, the external clock inputted from the external clock input terminal Xin is outputted intact as an internal clock $\phi$ via the AND gate 56 and the AND gate 55. And the microcomputer operates in synchronization with the internal clock $\phi$. When the WIT instruction is executed, the signal outputted from the WIT instruction execution circuit 53 to the AND gate 55 becomes in "L" level and the external clock is inputted, however, the internal clock is not generated. When the STP instruction is executed, on the other hand, the signal outputted from the STP instruction execution circuit 54 to the AND gate 56 becomes in "L" level and the external clock is not inputted at all, and the internal clock also is not generated.

Such a conventional microcomputer having the STP instruction and the WIT instruction as described above is made in such a configuration as the STP instruction or the WIT instruction is read out from the memory then decoded in the decoder, thereby to be executed. Therefore, in the case where the STP instruction code or the WIT instruction code is given to the decoder for some reason in contradiction to the instruction from the program, or a significant signal is given to the STP instruction execution circuit or to the WIT instruction execution circuit as a signal from the decoder by mistake for some reason, the STP instruction or the WIT instruction is executed immediately.

When the microcomputer enters in such a state as described above, operation thereof naturally halts until a specific operation for restoration is carried out. Consequently, in such a case as the microcomputer is used as a controller of actuator, the actuator does not operate at all or remains in the former operation state, thereby bringing about a very dangerous situation.

Further, when the STP instruction or the WIT instruction is executed while the microcomputer is running out of control, the clock generation stops thereby making the microcomputer completely unrestorable.

Because the STP instruction and the WIT instruction are used mainly for debugging or other operation during manufacture and development or for the reduction of power consumption, it is preferable that the STP instruction and the WIT instruction become not only unnecessary when manufacturing a product having a microcomputer incorporated therein as an actuator controller but also invalidated in order to avoid the danger of such problems as described above.

SUMMARY OF THE INVENTION

The present invention has been devised in such considerations as described above, and an object thereof is to provide a microcomputer capable of avoiding an instruction for stopping an internal clock from being executed by mistake.

The first aspect of the microcomputer of the invention comprises an exclusive register, a control circuit for detecting that data are stored consecutively in the register and that values of the data are in a predetermined combination, and means for permitting the execution of an instruction for stopping the clock only when a predetermined signal is being outputted from the control circuit.

The second aspect of the microcomputer of the invention can execute exclusive instruction, and comprises storing means for storing the fact that the exclusive instruction has been executed, judging means for judging whether an instruction, of which execution has been commanded following the execution of the exclusive instruction, is the instruction to stop the clock or not and, when the judging result is negative, deleting the storing content of the storing means, and means for permitting the execution of the instruction for stopping the clock only when the storing means stores the fact that the exclusive instruction has been executed.

In the first aspect of the microcomputer of the invention, the instruction for stopping the clock is executed by outputting a predetermined signal from the control circuit only when data of a predetermined combination are written consecutively in the exclusive register.

In the second aspect of the microcomputer of the invention, the instruction for stopping the clock is executed only when the execution of the instruction for stopping the clock is commanded following the exclusive instruction.

The above and further objects and features of the invention will more fully be apparent from the following detailed description with accompanying drawings.

DESCRIPTION OF THE PREFERRED EMBODIMENTS

The invention will now be described in detail below with reference to the accompanying drawings showing the preferred embodiments.

[First Embodiment]

Figure 2:
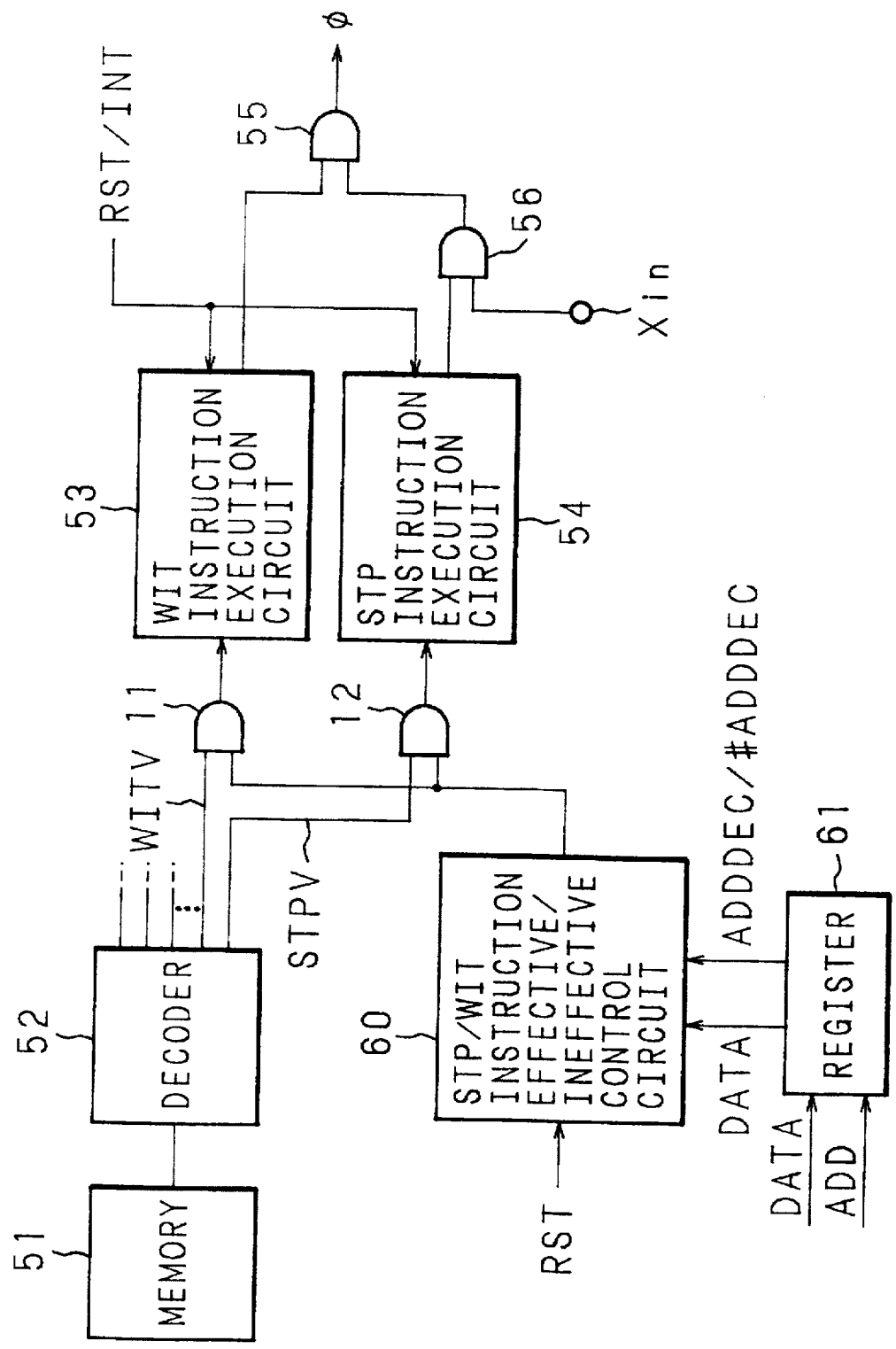
FIG. 2 is a block diagram showing an example of a configuration of an essential portion to control the execution of the STP instruction and the WIT instruction of the first embodiment of the microcomputer of the invention.

FIG. 2 is a block diagram showing an example of a configuration of an essential portion to control the execution of an STP instruction and a WIT instruction of the first embodiment of the microcomputer of the invention.

In FIG. 2, reference numeral 51 denotes a memory which stores various kinds of 8-bit instruction codes including the STP instruction and the WIT instruction. Reference numeral 52 denotes a decoder which decodes instruction codes read out from the memory 51 in a predetermined procedure. When the decoder 52 decodes the STP instruction or the WIT instruction described above, it makes a specific signal corresponding thereto to be significant, respectively. Specifically, when the WIT instruction is decoded, a WIT instruction valid signal WITV is made significant ("H" level) and, when STP instruction is decoded, an STP instruction valid signal STPV is made significant.

Both reference numerals 11 and 12 denote 2-input AND circuits. One input terminal of the AND circuit 11 receives the WIT instruction valid signal WITV which becomes significant when the decoder 52 decodes the WIT instruction, and another input terminal of the same receives the output signal of an STP/WIT instruction valid/invalid control circuit 60 to be described later. One input terminal of the AND circuit 12 receives the STP instruction valid signal STPV which becomes significant when the decoder 52 decodes the STP instruction, and another input terminal of the same receives the output signal of the STP/WIT instruction valid/invalid control circuit 60.

Reference numeral 53 denotes a WIT instruction execution circuit whereto the output signal of the AND circuit 11 is given. Reference numeral 54 denotes an STP instruction execution circuit whereto the output signal of the AND circuit 12 is given. Both instruction execution circuits 53 and 54 are constituted of flip-flops, for example, and are usually put in a insignificant state ("H" level) as a reset signal (RST) or an interrupt signal (INT) is given to one of the input terminals, while the outputs of the instruction execution circuits 53 and 54 are put in significant state ("L" level) when a significant signal ("H" level) is given from the AND circuit 11 or the AND circuit 12 to the other input terminals thereof.

Reference numeral 55 denotes a 2-input AND circuit. The output signal of the WIT instruction execution circuit 53 is given to one input terminal of the AND circuit 55 and the output signal of the AND circuit 56 is given to another input terminal of the same. The AND circuit 56 also has two inputs. The output signal of the STP instruction execution circuit 54 is inputted to one input terminal of the AND circuit 56 and an external clock is inputted from an external clock input terminal Xin to another input terminal of the same.

Reference numeral 60 denotes the STP/WIT instruction valid/invalid control circuit as described previously. It receives reset signal RST, and data signal DATA and address decoding signal ADDDEC/#ADDDEC outputted from a register 61. The register 61 receives data signal DATA and address signal ADD which are outputted from a CPU not shown in the drawing, and a signal given as the data signal DATA is written therein during the address signal ADD is given. It is only when two consecutive data to be written into the register 61 by the CPU have specified values respectively, that the output signal of the STP/WIT instruction valid/invalid control circuit 60 becomes significant and given to the AND gates 11 and 12 thereby to make the STP instruction and the WIT instruction be significant, though detailed description thereof will not be given here.

Figure 1:
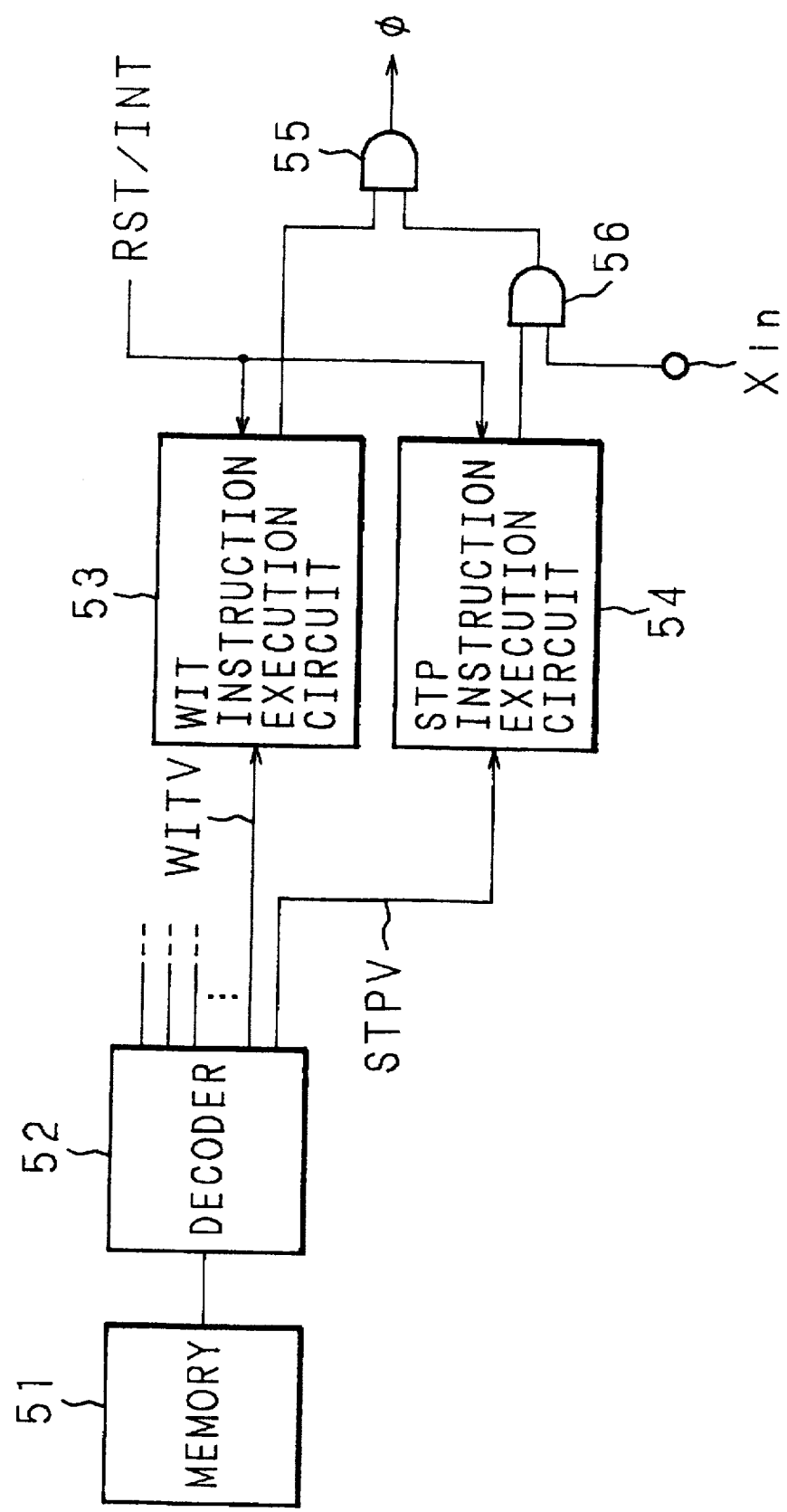
FIG. 1 is a block diagram showing an example of a configuration of an essential portion to execute an STP instruction and a WIT instruction of a conventional microcomputer.

The configuration of the essential portion of the first embodiment of the microcomputer of the invention is different from the configuration of the prior art shown in FIG. 1, in that the STP/WIT instruction valid/invalid control circuit 60 and the register 61 are newly added and accordingly the AND circuits 11 and 12 are provided for generating and giving a logical product signal of the output signal of the STP/WIT instruction valid/invalid control circuit 60 and the output signal of the decoder 52 to the instruction execution circuits 53 and 54.

Figure 3:
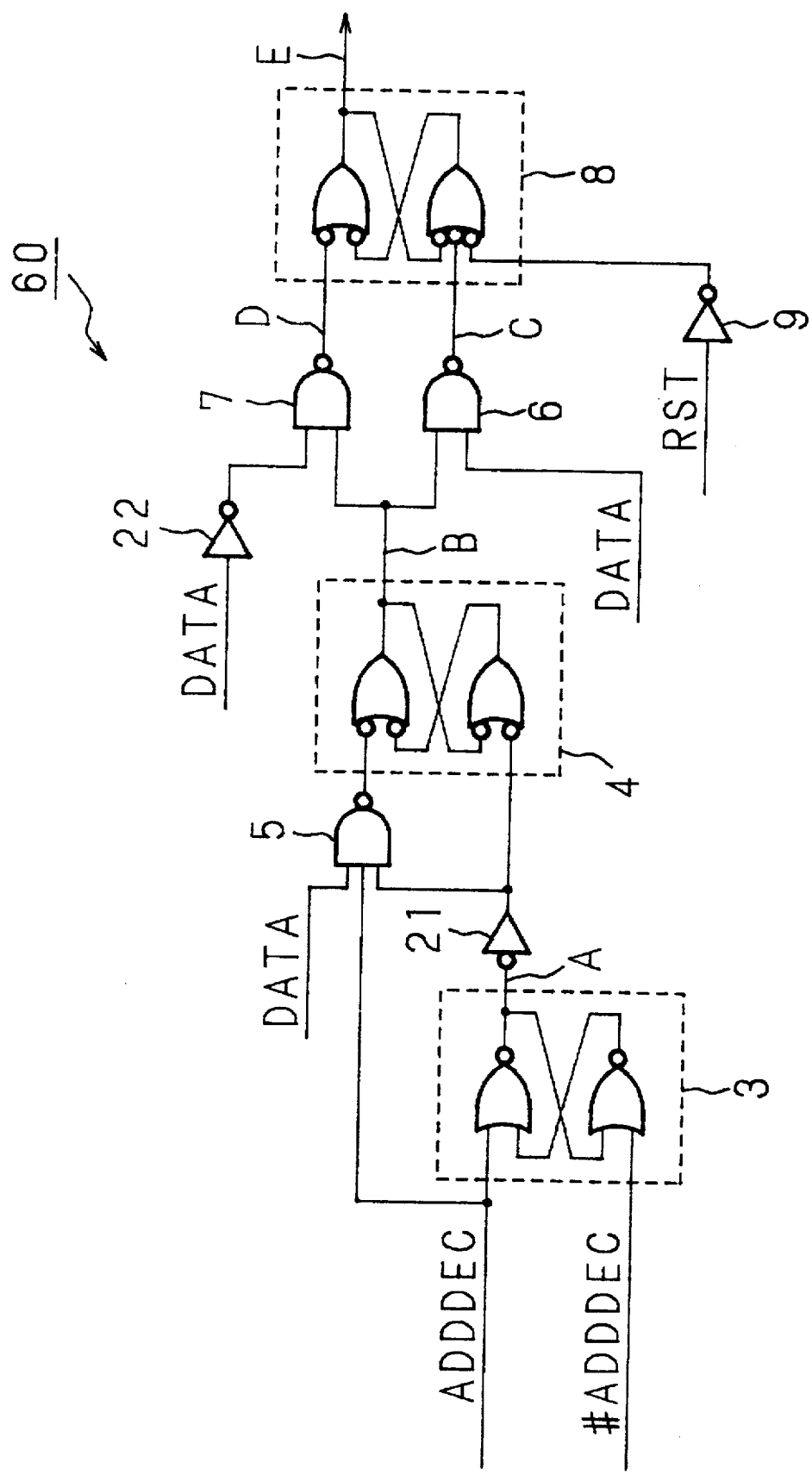
FIG. 3 is a logic circuit diagram showing an example of a specific configuration of an STP/WIT instruction valid/invalid control circuit shown in FIG. 2.

FIG. 3 is a logic circuit diagram showing an example of a specific configuration of the STP/WIT instruction valid/invalid control circuit 60. While various combinations of write data in order to make the STP instruction and the WIT instruction be significant, and circuits therefor can be realized, such a circuit as the instructions become significant only when the data are written consecutively in the order of "1" and "0", namely "H" level signal is immediately followed by "L" level signal is shown here as an example.

In FIG. 3, reference numeral 3 denotes a flip-flop in which two 2-input NOR circuits are used. Reference numeral 4 denotes a flip-flop in which two 2-input NAND circuits are used. Reference numeral 5 denotes a 3-input NAND circuit. Numerals 6 and 7 denote 2-input NAND circuits. Reference numeral 8 denotes a flip-flop in which a 2-input NAND circuit and a 3-input NAND circuit are used. Reference numeral 9 denotes an inverter circuit.

Reference character ADDDEC denotes an address decode signal which turns to "H" level when the address allocated to the register 61 is accessed, and turns to "L" level when the address is not accessed, and reference character #ADDDEC denotes an inverted signal of the address decode signal ADDDEC (hereinafter called inverted address decode signal).

Reference character DATA denotes a signal of the data written into the register 61. Reference character RST denotes a reset signal, and "H" level thereof causes the microcomputer not to operate and "L" level thereof causes the microcomputer to be in reset cancel state and to be in start operation.

The components shown in FIG. 3 will be described below.

The flip-flop 3 functions as a judging circuit which judges whether the register 61 is continually accessed or not, in other word, data are written in the register 61 consecutively. At the flip-flop 3, the address decode signal ADDDEC is inputted to one input terminal and the inverted address decode signal #ADDDEC is inputted to another input terminal thereof.

Consequently, when the address decode signal ADDDEC turns to "H" level (the inverted address decode signal #ADDDEC turns to "L" level at the same time), in other word, the access to the register 61 is started, the flip-flop 3 outputs a signal A of "L" level from the output terminal thereof. Conversely, when the address decode signal ADDDEC turns to "L" level (the inverted address decode signal #ADDDEC turns to "H" level at the same time), in other word, the access to the register 61 is completed, the flip-flop 3 outputs the signal A of "H" level from the output terminal thereof.

The flip-flop 4 and the NAND circuit 5 function as a judging circuit for the first write data. At the NAND circuit 5, the address decode signal ADDDEC, a signal obtained by inverting the output signal A of the flip-flop 3 by the inverter 21 and data signal DATA from the register 61 are inputted. The NAND circuit 5 outputs the signal of "L" level only when all of the input signals thereto are at "H" level. Consequently, the NAND circuit 5 detects that the data written into the register 61 is "1" ("H" level) during the register 61 is accessed and outputs a signal of "L" level.

The flip-flop 4 has a function for holding the judging result of the NAND circuit 5. At the flip-flop 4, the output signal of the NAND circuit 5 is inputted to one input terminal and a signal obtained by inverting the output signal A of the flip-flop 3 by the inverter 21 is inputted to another input terminal. Consequently, the flip-flop 4 outputs a signal B of "H" level when the register 61 is being accessed and the data written into the register 61 is "1". The state that the signal B of "H" level is outputted from the flip-flop 4 continues until the access to the register 61 is stopped or "0" is written as new data into the register 61.

The NAND circuit 6, the NAND circuit 7 and the flip-flop 8 function as a judging circuit for the second write data. At the NAND circuit 6, the output signal B of the flip-flop 4 is inputted to one input terminal, and the data signal DATA written in the register 61 is inputted to another input terminal. At the NAND circuit 7, a signal obtained by inverting the data signal DATA written in the register 61 by the inverter 22 is inputted to one input terminal and the output signal B of the flip-flop 4 is inputted to another input terminal. At the flip-flop 8, the output signal D of the NAND circuit 7 is inputted to one input terminal, the output signal C of the NAND circuit 6 to another input terminal and a signal obtained by inverting the reset signal RST by the inverter 9 is inputted to the remaining input terminal.

Consequently, the NAND circuit 7 outputs a signal D of "L" level only when the output signal B of the flip-flop 4 is at "H" level and the data signal DATA is at "L" level. That is, the NAND circuit 7 outputs the signal D of "L" level when the register 61 is accessed and the data "0" is written in the register 61.

The NAND circuit 6 outputs the signal C of "L" level only when both input signals thereto are at "H" level. That is, the NAND circuit 6 outputs the signal C of "L" level when the register 61 is accessed and data "1" is written in the register 61.

The flip-flop 8 has a function for storing the output signal D of the NAND circuit 7 or the output signal C of the NAND circuit 6. At the flip-flop 8, the output signal D of the NAND circuit 7 is inputted to one input terminal and the output signal C of the NAND circuit 6 is inputted to another input terminal. Consequently, the flip-flop 8 outputs a signal E of "H" level when the output signal D of the NAND circuit 7 turns from "H" level to "L" level, and outputs the signal E of "L" level when the output signal C of the NAND circuit 6 turns from "H" level to "L" level. The flip-flop 8 also outputs the signal E of "L" level when the reset signal RST turns from "L" level to "H" level, because the signal of "L" level obtained by inverting at the inverter 9 is inputted thereto.

The STP/WIT instruction valid/invalid control circuit 60 is so configured as to be described above, wherein the output signal E from the flip-flop 8 is given to the AND gates 11 and 12 in its final stage. When the output signal E of the flip-flop 8 of the STP/WIT instruction valid/invalid control circuit 60 is significant ("H" level) and the signal given from the decoder 52 is significant (when the WIT instruction is decoded by the decoder 52), the AND gate 11 outputs a significant ("H" level) signal to the WIT instruction execution circuit 53. As a consequence, because the WIT instruction execution circuit 53 outputs an "L" level signal to the AND circuit 55, the microcomputer enters into a state in which the internal clock φ is not generated and thereafter into a wait state.

The AND gate 12 outputs a significant ("H" level) signal to the STP instruction execution circuit 54 when the output signal E of the flip-flop 8 of the STP/WIT instruction valid/invalid control circuit 60 is significant ("H" level) and the signal given from the decoder 52 is significant (when the STP instruction is decoded by the decoder 52). As a consequence, because the STP instruction execution circuit 54 outputs a signal of "L" level to the AND circuit 56, the microcomputer enters into a state in which the external clock is not inputted and thereafter into a stop state.

Now the overall operation of the example of the configuration of the essential portion to execute the STP instruction and the WIT instruction in the first embodiment of the microcomputer of the invention will be described below. At first, it is assumed that the output signal E of the flip-flop 8 is at "L" level, and a CPU not shown in the drawings has accessed to the register 61 and written data "1" therein.

In this case, because the register 61 is accessed and data "1" is written therein, the address decode signal ADDDEC turns to "H" level, the inverted address decode signal #ADDDEC turns to "L" level and the data signal DATA turns to "H" level. This causes the output signal A of the flip-flop 3 to turn to "L" level, inverted by the inverter 21 and outputted to the NAND circuit 5 and to the flip-flop 4. Thus because the two input terminals of the flip-flop 4 receive "H" level signal from the inverter 21 and "L" level signal from the NAND circuit 5, respectively, the output signal B of the flip-flop 4 becomes in "H" level.

At this time, because the output signal B of "H" level of the flip-flop 4 and a signal of "L" level obtained by inverting the data "1" written in the register 61 by an inverter 22 are inputted to the two input terminals of the NAND circuit 7, respectively, the output signal D thereof is at "H" level. Also because the output signal B of "H" level of the flip-flop 4 and a signal of "H" level which is the data "1" written in the register 61 being outputted intact are inputted to the two input terminals of the NAND circuit 6, the output signal C thereof is at "L" level. As a consequence, the output signal of the flip-flop 8, that is, the output signal of the STP/WIT instruction valid/invalid control circuit 60 is at "L" level.

When the output signal of the STP/WIT instruction valid/invalid control circuit 60 is at "L" level, a signal of "H" level is not outputted from the AND gates 11 and 12, and therefore the STP instruction or the WIT instruction will never be executed even when the STP instruction or the WIT instruction is decoded by the decoder 52 by mistake.

When the CPU not shown in the drawing writes data "0" into the register 61 under this condition, that is, when "0" is written following "1" in the register 61, one of the input signals to the NAND circuit 5, that is, data signal DATA turns to "L" level. Therefore, although the output signal of the NAND circuit 5 which is the input signal to one input terminal of the flip-flop 4 turns to "H" level, the output signal of the inverter 21 (inverted output signal A of the flip-flop 3) which is the input signal to another input terminal of the flip-flop 4 does not change and therefore the output signal B of the flip-flop 4 keeps "H" level. At the same time, because the data signal DATA is inverted by the inverter 22 and is given to one input terminal of the NAND circuit 7, both input signals to the NAND circuit 7 become "H" level. Consequently the output signal D of the NAND circuit 7 turns to "L" level thereby causing the output signal E of the flip-flop 8 to change to "H" level.

Thus when data "0" is written following the writing of data "1" into the register 61, the output signal E of the flip-flop 8, that is, the output signal of the STP/WIT instruction valid/invalid control circuit 60, turns to "H" level. Therefore, in the case where execution of the STP instruction or the WIT instruction is directed and the instruction codes thereof are decoded by the decoder 52 at this time, output signal of the AND gate 11 or 12 turns to "H" level so that the STP instruction or the WIT instruction is executed.

In addition, in the case where data "1" is written into the register 61 at first, then data "1", not "0", is written, the operation proceeds as follows. As data "1" is written into the register 61 at first, the output signal B of the flip-flop 4 turns to "H" level as described above. When data "1" is written into the register 61 under this condition, the data signal DATA of "H" level is inputted to another input terminal of the NAND circuit 6 while it is inverted by the inverter 22 and inputted to one input terminal of the NAND circuit 7.

Thus because the output signal C of the NAND circuit 6 turns to "L" level and the output signal D of the NAND circuit 7 turns to "H" level, the output signal E of the flip-flop 8, that is, the output signal of the STP/WIT instruction valid/invalid control circuit 60, turns to "L" level. Therefore, because "H" level signal is not outputted from the AND gates 11 and 12, the STP instruction or the WIT instruction will never be executed even when the STP instruction or the WIT instruction is decoded by the decoder 52 by mistake.

Now a case where data "0" is written at first in the register 61 will be described below. In this case, because it is same as those cases described above that the register 61 is accessed, the output signal A of the flip-flop 3 becomes "L" level. On the other hand, because the data signal DATA of "L" level is inputted to the NAND circuit 5, the output signal thereof becomes "H" level. Consequently, because input signals to both input terminals of the flip-flop 4 become "H" level, the output signal B of the flip-flop 4 keeps the former level. Thus the output signal E of the flip-flop 8 also keeps the former level. Under this condition, operation when data "1" is written subsequently in the register 61 is same as described above and, when "0" is written, the former state is maintained.

In the first embodiment of the microcomputer of the invention, as described above, execution of the STP instruction or the WIT instruction is enabled only when data "1" and "0" are written successively into the register 61 in this order.

[Second Embodiment]

Figure 4:
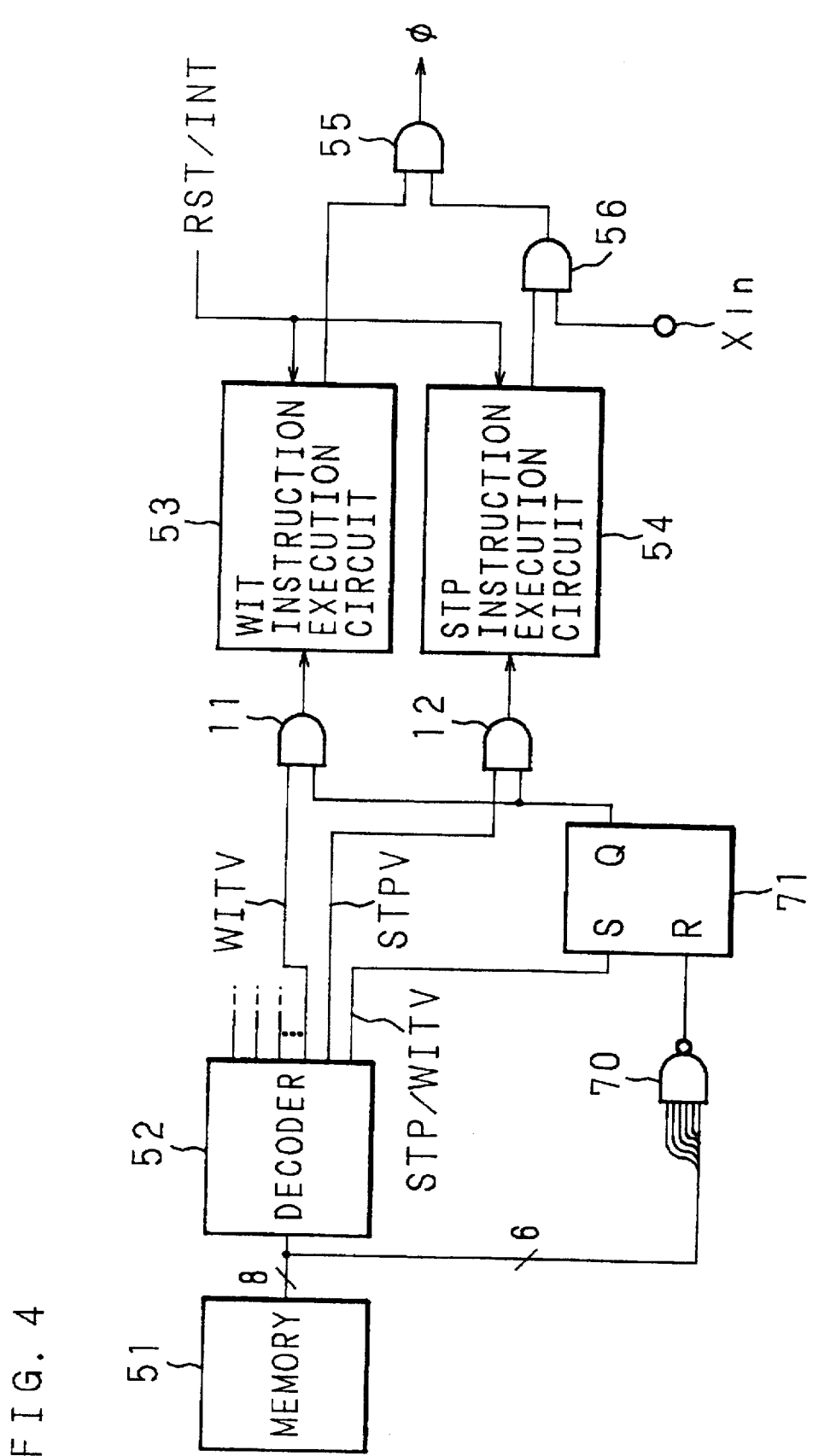
FIG. 4 is a block diagram showing an example of a configuration of an essential portion to control the execution of the STP instruction and the WIT instruction of the second embodiment of the microcomputer of the invention.

FIG. 4 is a block diagram showing an example of a configuration of an essential portion to control the execution of the STP instruction and the WIT instruction of a microcomputer of the second embodiment of the invention.

In FIG. 4, Reference numeral 51 denotes a memory which stores various 8-bit instruction codes including the STP instruction and the WIT instruction. Reference numeral 52 denotes a decoder which decodes instruction codes which are read from the memory 51 in a specified procedure. When the decoder 52 decodes the STP instruction or the WIT instruction described above, it makes a specific signal corresponding thereto be significant. Specifically, when the WIT instruction is decoded, the WIT instruction valid signal WITV is made significant ("H" level) and, when the STP instruction is decoded, the STP instruction valid signal STPV is made significant.

Both reference numerals 11 and 12 denote 2-input AND circuits. One input terminal of the AND circuit 11 receives the WIT instruction valid signal WITV which becomes significant when the decoder 52 decodes the WIT instruction, and another input terminal receives the output signal from an output terminal Q of a set/reset flip-flop (hereinafter to be called SR flip-flop) 71 to be described later. One input terminal of the AND circuit 12 receives the STP instruction valid signal STPV which becomes significant when the decoder 52 decodes the STP instruction, and another input terminal receives the output signal from the output terminal Q of the SR flip-flop 71.

Reference numeral 53 denotes a WIT instruction execution circuit whereto the output signal of the AND circuit 11 is given. Reference numeral 54 denotes a STP instruction execution circuit whereto the output signal of the AND circuit 12 is given. Both instruction execution circuits 53 and 54 are constituted of flip-flops, for example, and the outputs thereof are usually put in insignificant state ("H" level) as a reset signal (RST) or an interrupt signal (INT) is given to one input terminal, while the output signals of the instruction execution circuits 53 and 54 are put in significant state ("L" level) when a significant signal ("H" level) is given from the AND circuit 11 or the AND circuit 12.

Reference numeral 55 denotes a 2-input AND circuit. The output signal of the WIT instruction execution circuit 53 is inputted to one input terminal of the AND circuit 55 and the output signal of an AND circuit 56 is inputted to another input terminal of the same. The AND circuit 56 also has two inputs. The output signal of the STP instruction execution circuit 54 is inputted to one input terminal of the AND circuit 56 and an external clock from an external clock input terminal Xin is inputted to another input terminal of the same.

Reference numeral 70 denotes a 6-input NAND circuit which receives the higher 6 bits of 8-bit instruction codes outputted from the memory 51 to the decoder 52. The output signal of the NAND circuit 70 is given to a reset terminal R of the SR flip-flop 71.

At the SR flip-flop 71, the output signal of the aforementioned NAND circuit 70 is inputted to the reset terminal R thereof and the STP/WIT instruction valid signal STP/WITV which becomes significant when STP/WIT instruction valid/invalid control instruction which is peculiar to the second embodiment by the decoder 52 is decoded is inputted thereto. The output signal from the output terminal Q of the SR flip-flop 71 is given to the AND gates 11 and 12 as described above.

The configuration of the essential portion of the second embodiment of the microcomputer of the invention is different from the configuration of the first embodiment in that the STP/WIT instruction valid/invalid control circuit 60 and the register 61 are replaced by the NAND circuit 70 and the SR flip-flop 71. Also in the second embodiment, the STP/WIT instruction valid/invalid control instruction which is peculiar to this embodiment can be executed, being allocated with 8-bit code similarly to other instructions and is stored in advance in the memory 51.

Instruction codes of the STP instruction, WIT instruction and STP/WIT instruction valid/invalid control instruction in the second embodiment will now be described below. Basically, these three instructions are required only to have the same values in the higher 6 bits of eight bits of the instruction codes. In the second embodiment, such a case will be taken as an example that the instruction code of the STP instruction is "FF" in hexadecimal notation ("1111 1111" in binary notation), the instruction code of the WIT instruction is "FE" in hexadecimal notation ("1111 1110" in binary notation and the instruction code of the STP/WIT instruction valid/invalid control instruction is "FD" in hexadecimal notation ("1111 1101" in binary notation). In addition, an instruction code "FC" in hexadecimal notation ("1111 1100" in binary notation) is not used in the second embodiment.

Operation of the second embodiment of the microcomputer of the invention shown in FIG. 4 will be described below.

In the second embodiment, the STP/WIT instruction valid/invalid control instruction must be executed prior to the STP instruction or the WIT instruction. That is, when execution of the STP instruction or the WIT instruction is directed without executing the STP/WIT instruction valid/invalid control instruction, the STP instruction or the WIT instruction will not be executed.

At first, when an instruction other than the STP instruction, the WIT instruction or the STP/WIT instruction valid/invalid control instruction, in other word, an instruction whose higher 6 bits are not "111111", is directed, the operation proceeds as follows.

An instruction code read from the memory 51 is given to the decoder 52 while the higher 6 bits thereof are given to the NAND circuit 70. The output signal of the NAND circuit 70 becomes "H" level in this case. Because the reset terminal R of the SR flip-flop 71 is given the output signal of the NAND circuit 70, the SR flip-flop 71 becomes in reset state and a signal of "L" level is outputted from the output terminal Q thereof. Because the output signal of the SR flip-flop 71 is inputted to the AND gates 11 and 12, the AND gates 11 and 12 do not output "H" level signals. Under this condition, therefore, the STP instruction or the WIT instruction will never be executed even when the execution of the STP instruction or the WIT instruction is directed, as a matter of course, or the STP instruction code or the WIT instruction code is inputted to the decoder 52 by mistake, or the WIT instruction valid signal WITV or the STP instruction valid signal STPV is made significant by mistake.

Meanwhile, when the execution of the STP/WIT instruction valid/invalid control instruction is directed, the instruction code "FD" of the STP/WIT instruction valid/invalid control instruction is outputted from the memory 51 and inputted to the decoder 52. At this time, the higher 6 bits "111111" of the instruction code "FD" of the STP/WIT instruction valid signal STP/WITV are inputted to the NAND circuit 70. This causes the NAND circuit 70 to output a signal of "L" level to the reset terminal R of the SR flip-flop 71.

On the other hand, the decoder 52 decodes the instruction code "FD" of the STP/WIT instruction valid/invalid control instruction and turns the STP/WIT instruction valid signal STP/WITV to "H" level. Because the STP/WIT instruction valid signal STP/WITV is given to the set terminal S of the SR flip-flop 71, the SR flip-flop 71 enters into set state and outputs a signal of "H" level from the output terminal Q to the AND gates 11 and 12.

It is assumed that execution of the STP instruction or the WIT instruction, the STP instruction in this case, for example, is subsequently directed. Then the instruction code "FF" of the STP instruction is outputted from the memory 51 to the decoder 52. At this time, the higher 6 bits "111111" of the instruction code "FF" of the STP instruction are inputted to the NAND circuit 70. This causes the NAND circuit 70 to continue to output a signal of "L" level to the reset terminal R of the SR flip-flop 71. Therefore, the SR flip-flop 71 is kept in the set state at this time.

On the other hand, the decoder 52 decodes the instruction code "FF" of the STP instruction and turns the STP instruction valid signal STPV to "H" level. Though the STP/WIT instruction valid signal STP/WITV turns to "L" level, a signal of "H" level is not inputted to the reset terminal R of the SR flip-flop 71, and therefore the SR flip-flop 71 is kept in the set state also at this time.

Because the STP instruction valid signal STPV of "H" level is given to one input terminal of the AND gate 12, the output signal of the AND gate 12 turns to "H" level. Because the output signal of the AND gate 12 is given to the STP instruction execution circuit 54, the STP instruction is executed.

Thereafter, when an instruction other than the STP instruction, the WIT instruction or the STP/WIT instruction valid/invalid control instruction, in other word, an instruction having the higher 6 bits thereof being not "111111", is executed, the output signal of the NAND circuit 70 turns to "H" level because at least one bit of the input signal of 6 bits to the NAND circuit 70 is "0". Therefore, because the reset terminal R of the SR flip-flop 71 is given a signal of "H" level, the SR flip-flop 71 enters into a set state, and a signal outputted from the output terminal Q thereof becomes "L" level. Thus because the output signal of the AND gates 11 and 12 do not become "H" level, the STP instruction or the WIT instruction will never be executed even when the execution of the STP instruction or the WIT instruction is directed by mistake, or the STP instruction valid signal STPV or the WIT instruction valid signal WITV is turned to "H" level by mistake.

Although the NAND circuit having 6 inputs is used to judge the higher 6 bits of an instruction code of each instruction in the second embodiment described above, this is because the higher 6 bits of the STP/WIT instruction valid/invalid control instruction, the STP instruction and the WIT instruction are unified to "111111". In the case where these bits have another bit pattern, a circuit that matches the bit pattern may be used instead of the NAND circuit having 6 inputs.

In the second embodiment, as described above, the STP instruction or the WIT instruction is executed only when the execution thereof is directed immediately after a peculiar instruction, that is, the STP/WIT instruction valid/invalid control instruction, is executed.

According to the first aspect of the microcomputer of the invention, as described in detail above, a predetermined signal is outputted from the control circuit so that the instruction to stop the clock is executed, only when data of a predetermined combination are written consecutively in the exclusive register. Because this eliminates the possibility of the stop instruction or the wait instruction being executed by mistake, such a situation that the clock is stopped during uncontrollable operation of the microcomputer resulting in completely unrestorable condition can be avoided.

In the case where the reset signal is given, output of the predetermined signal from the control circuit is stopped and the execution of the instruction for stopping the clock is also stopped, and therefore it is made easier to reset from the uncontrollable operation by resetting.

According to the second aspect of the microcomputer of the invention, the instruction for stopping the clock is executed only when the execution of the instruction for stopping the clock is directed following the exclusive instruction. Because this eliminates the possibility of the stop instruction or the wait instruction being executed by mistake, such a situation that the clock is stopped during uncontrollable operation of the microcomputer resulting in completely unrestorable condition can be avoided.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalents of such meets and bounds thereof are therefore intended to be embraced by the claims.

What is claimed is:

1. A microcomputer having a first instruction execution circuit which executes a first instruction for stopping the input of a clock from the outside being a reference of the operation, and a second instruction execution circuit which executes a second instruction for stopping the supply of said clock inputted from the outside to the inside, comprising:

a register;

a control circuit which outputs a predetermined signal when it is detected that data are written consecutively into said register and that the values of each data are in a predetermined combination;

means for permitting said first instruction execution circuit to execute said first instruction only when said predetermined signal is being outputted from said control circuit; and means for permitting said second instruction execution circuit to execute said second instruction only when said predetermined signal is being outputted from said control circuit.

2. The microcomputer as set forth in claim 1, wherein said control circuit comprises:

first means for detecting that data are being written into said register; and second means for detecting that values of the data written consecutively into said register are in the predetermined combination, during said first means is detecting the writing of the data.

3. The microcomputer as set forth in claim 1, wherein said control circuit has means for stopping the output of said predetermined signal when a reset signal is given during the output of said specified signal.

4. A microcomputer having a first instruction execution circuit which executes a first instruction for stopping the input of a clock from the outside being a reference of the operation, and a second instruction execution circuit which executes a second instruction for stopping the supply of said clock inputted from the outside, comprising:

storing means for storing a fact that a third instruction has been executed;

judging means for judging whether an instruction which has been directed following said third instruction is said first instruction or said second instruction or not, and for deleting the content stored in said storing means when the judging result is negative;

means for permitting said first instruction execution circuit to execute said first instruction only when said storing means stores the fact that said third instruction was executed; and means for permitting said second instruction execution circuit to execute said second instruction only when said storing means stores the fact that said third instruction was executed.

5. The microcomputer as set forth in claim 4, wherein said first, second and third instructions are configured to have bit strings which do not agree with those of any other instruction codes, and said judging means is so configured as to delete the contents stored in said storing means when a bit string different from said common bit string is included in a bit string of an instruction whose execution is directed.

* * * * *